United States Patent
Tan

(10) Patent No.: US 10,684,394 B2
(45) Date of Patent: Jun. 16, 2020

(54) ANTI-REFLECTION STRUCTURE AND FABRICATION METHOD THEREOF, DISPLAY DEVICE AND FABRICATION METHOD THEREOF

(71) Applicant: BOE Technology Group Co., Ltd., Beijing (CN)

(72) Inventor: Jifeng Tan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 279 days.

(21) Appl. No.: 15/531,791

(22) PCT Filed: Nov. 1, 2016

(86) PCT No.: PCT/CN2016/104176
§ 371 (c)(1),
(2) Date: May 31, 2017

(87) PCT Pub. No.: WO2017/128794
PCT Pub. Date: Aug. 3, 2017

(65) Prior Publication Data
US 2018/0067232 A1   Mar. 8, 2018

(30) Foreign Application Priority Data

Jan. 28, 2016   (CN) .......................... 2016 1 0061301

(51) Int. Cl.
*H01L 51/52*   (2006.01)
*H01L 51/00*   (2006.01)
(Continued)

(52) U.S. Cl.
CPC ................. *G02B 1/11* (2013.01); *G02B 1/113* (2013.01); *G02B 5/3033* (2013.01);
(Continued)

(58) Field of Classification Search
CPC ...... G02B 5/3083; G02B 5/3016; G02B 1/11; G02B 1/14; G02F 1/133528; G02F 1/136209; H01L 51/5281
See application file for complete search history.

(56) References Cited

U.S. PATENT DOCUMENTS 6,005,651 A * 12/1999 Takahara .......... G02F 1/133502
349/10
6,169,589 B1 * 1/2001 Kaneko ............... G02F 1/13363
349/117
(Continued)

FOREIGN PATENT DOCUMENTS

CN   1875300 A    12/2006
CN   101241260 A   8/2008
(Continued)

OTHER PUBLICATIONS

Jan. 24, 2017—(WO) International Search Report and Written Opinion Appn PCT/CN2016/104176 with English Tran.
(Continued)

*Primary Examiner* — Bradley Smith
*Assistant Examiner* — David J Goodwin
(74) *Attorney, Agent, or Firm* — Banner & Witcoff, Ltd.

(57) ABSTRACT

An anti-reflection structure and a fabrication method thereof, a display device and a fabrication method thereof are provided. The anti-reflection structure includes a retardation film, a linear polarizer sheet, and at least one alignment layer, configured to align the retardation film and the linear polarizer sheet, wherein, the retardation film and the linear polarizer sheet include liquid crystal.

19 Claims, 10 Drawing Sheets

(51) Int. Cl.
  *G02B 1/11*   (2015.01)
  *G02F 1/13363*   (2006.01)
  *G02F 1/1333*   (2006.01)
  *G02F 1/1335*   (2006.01)
  *G02B 1/113*   (2015.01)
  *G02B 5/30*   (2006.01)
  *G02F 1/1337*   (2006.01)

(52) U.S. Cl.
  CPC .... *G02F 1/13363* (2013.01); *G02F 1/133305* (2013.01); *G02F 1/133502* (2013.01); *G02F 1/133528* (2013.01); *G02F 1/1337* (2013.01); *G02F 2001/133531* (2013.01); *G02F 2001/133562* (2013.01); *G02F 2001/133635* (2013.01); *G02F 2001/133638* (2013.01)

(56) References Cited

U.S. PATENT DOCUMENTS

| | | | |
|---|---|---|---|
| 6,219,122 B1* | 4/2001 | Uchida | G02F 1/133634 252/299.1 |
| 6,307,608 B1* | 10/2001 | Sakamoto | G02F 1/133632 349/117 |
| 6,358,759 B1* | 3/2002 | Hirabayashi | G02F 1/136209 257/E27.132 |
| 6,646,702 B1 | 11/2003 | Motomura et al. | |
| 6,777,070 B1* | 8/2004 | Murata | C08F 259/08 428/323 |
| 9,164,211 B2* | 10/2015 | Yim | H01L 51/5281 |
| 2007/0024970 A1 | 2/2007 | Lub et al. | |
| 2009/0146946 A1 | 6/2009 | Takama et al. | |
| 2010/0055353 A1 | 3/2010 | Cho et al. | |
| 2012/0327336 A1 | 12/2012 | Jeon et al. | |
| 2014/0036175 A1* | 2/2014 | Morishima | G02B 5/3016 349/15 |
| 2014/0168767 A1* | 6/2014 | Shin | G02B 5/3083 359/485.01 |
| 2014/0192297 A1 | 7/2014 | Choi et al. | |
| 2015/0129852 A1 | 5/2015 | Park et al. | |
| 2015/0153497 A1* | 6/2015 | Chang | G02B 5/3016 349/194 |
| 2015/0301352 A1 | 10/2015 | Wang | |
| 2015/0325813 A1* | 11/2015 | Haag | G02B 27/281 257/40 |
| 2015/0378075 A1 | 12/2015 | Gam et al. | |
| 2016/0077267 A1* | 3/2016 | Inagaki | B32B 23/04 359/489.07 |
| 2016/0299395 A1* | 10/2016 | Kosuge | G02F 1/136209 |
| 2016/0329527 A1 | 11/2016 | Yang et al. | |
| 2017/0023716 A1* | 1/2017 | Kitagawa | G02B 5/3016 |
| 2017/0187004 A1* | 6/2017 | Giraldo | H01L 51/5253 |
| 2018/0107078 A1* | 4/2018 | Ishigaki | G02F 1/133345 |
| 2018/0151829 A1* | 5/2018 | Yoon | H01L 51/5237 |

FOREIGN PATENT DOCUMENTS

| | | |
|---|---|---|
| CN | 101578348 A | 11/2009 |
| CN | 101685582 A | 3/2010 |
| CN | 101710192 A | 5/2010 |
| CN | 102842271 A | 12/2012 |
| CN | 103913887 A | 7/2014 |
| CN | 104319282 A | 1/2015 |
| CN | 104637984 A | 5/2015 |
| CN | 104793281 A | 7/2015 |
| CN | 104867872 A | 8/2015 |
| CN | 105006203 A | 10/2015 |
| CN | 105510999 A | 4/2016 |
| JP | 2006349998 A | 12/2006 |

OTHER PUBLICATIONS

Dec. 29, 2016—(CN) First Office Action Appn 201610061301.4 with English Tran.
Jul. 11, 2017—(CN) Second Office Action Appn 201610061301.4 with English Tran.
Jan. 3, 2019—(CN) Fourth Office Action Appn 201610061301.4 with English Translation.
Sep. 9, 2019—(EP) Extended European Search Report Appn No. 16867381.2.

* cited by examiner

ANTI-REFLECTION STRUCTURE AND FABRICATION METHOD THEREOF, DISPLAY DEVICE AND FABRICATION METHOD THEREOF

The application is a U.S. National Phase Entry of International Application No. PCT/CN2016/104176 filed on Nov. 1, 2016, designating the United States of America and claiming priority to Chinese Patent Application No. 201610061301.4 filed on Jan. 28, 2016. The present application claims priority to and the benefit of the above-identified applications and the above-identified applications are incorporated by reference herein in their entirety.

TECHNICAL FIELD

Embodiments of the present disclosure relate to an anti-reflection structure and a fabrication method thereof, a display device and a fabrication method thereof.

BACKGROUND

Flexible display, which is thin and light-weighted, bendable and even rollable and has many other advantages, has thus become one of main trends of a display technology, and has a broad prospect in a future market.

With respect to a flexible display, in order to reduce reflection of external light on internal metal wiring or the like, a polarizer attached to the outside of a display panel is generally used as an anti-reflection structure, but such an anti-reflection structure has a large thickness, for example, a commonly used polarizer has a thickness of 100 µm to 150 µm, while a retardation film has a thickness of 20 µm to 100 µm, so that a total thickness of the anti-reflection structure constituted by the two is between 120 µm and 250 µm. Obviously, by using the structure, a thickness of the flexible display becomes large, so that the flexible display becomes thick and heavy, which loses characteristics of lightness and thinness, so the structure is not suitable for flexible display.

Therefore, there is an urgent need for an anti-reflection structure which is thinner and capable of implementing light, thin and flexible display.

SUMMARY

At least one embodiment of the present disclosure provides an anti-reflection structure and a fabrication method thereof, a display device and a fabrication method thereof. The anti-reflection structure has relative small thickness, so that the display device including the anti-reflection structure not only can achieve light and flexible display, but also can ensure relative high degree of polarization.

At least one embodiment of the present disclosure provides an anti-reflection structure, including: a retardation film, a linear polarizer sheet, provided on a side of the retardation film, and at least one alignment layer, configured to align the retardation film and align the linear polarizer sheet, wherein, the retardation film and the linear polarizer sheet include liquid crystal.

At least one embodiment of the present disclosure further provides a display device, including: a display panel and the anti-reflection structure described above, wherein, the display panel includes an array substrate and a counter substrate provided opposite to the array substrate, the anti-reflection structure is provided between the array substrate and the counter substrate; or the anti-reflection structure is located on a side of the counter substrate opposite to the array substrate.

At least one embodiment of the present disclosure further provides a fabrication method of a display device, including: providing a display panel, the display panel including an array substrate and a counter substrate provided opposite to each other, the array substrate including: a base substrate; and a plurality of pixel units formed on the base substrate, each of the plurality of pixel units having an organic light emitting diode and a thin film transistor formed therein, wherein, the plurality of pixel units are located between the counter substrate and the base substrate; fabricating an anti-reflection structure, including: forming a retardation film, a first alignment layer and a linear polarizer sheet on the base substrate with the organic light emitting diode and the thin film transistor formed thereon or on the counter substrate, wherein, the first alignment layer is located between the retardation film and the linear polarizer sheet, and the retardation film and the linear polarizer sheet include liquid crystal.

At least one embodiment of the present disclosure further provides a fabrication method of an anti-reflection structure, including: preparing a substrate; forming a retardation film, a first alignment layer and a linear polarizer sheet on the substrate, wherein, the first alignment layer is located between the retardation film and the linear polarizer sheet, and the retardation film and the linear polarizer sheet include liquid crystal.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1A:
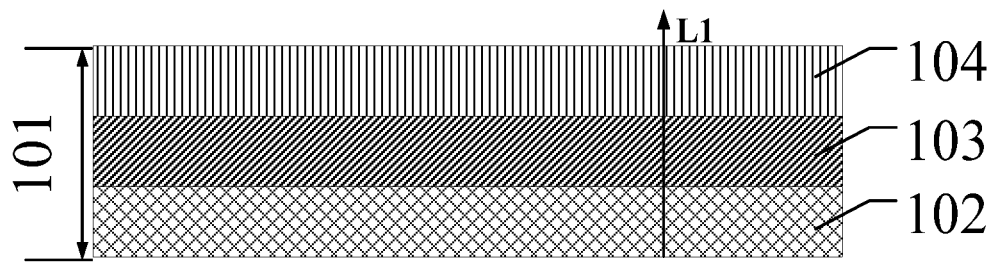
FIG. 1a and FIG. 1b are respectively two exemplary structural schematic diagrams of an anti-reflection structure according to an embodiment of the present disclosure.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, the technical terms or scientific terms here should be of general meaning as understood by those ordinarily skilled in the art. "First", "second" and similar words used in the present disclosure do not represent any sequence, quantity or importance and merely intend to differentiate different composite parts. Similarly, words such as "one", "a/an" or "the" or the like do not denote quantitative limitation, but rather indicate there is at least one. Words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but can include electrical connection, either direct or indirect. Words such as "up", "down", "left", "right" and the like are only used for expressing relative positional relationship, when the absolute position is a described object is changed, the relative positional relationship can also be correspondingly changed.

At least one embodiment of the present disclosure provides an anti-reflection structure and a fabrication method thereof, a display device and a fabrication method thereof. The anti-reflection structure includes sequentially: a retardation film; a first alignment layer, provided on a light emergent side of the retardation film; and a linear polarizer sheet, provided on a light emergent side of the first alignment layer; wherein, the retardation film and the linear polarizer sheet includes liquid crystal. With respect to a conventional anti-reflection structure attached to outside of a flexible display panel, the anti-reflection structure according to the embodiment of the present disclosure has a significantly reduced thickness, so that display in which the anti-reflection structure is used can implement ultra-thin display. Further, in the embodiment of the present disclosure, in order to obtain a higher degree of polarization while reducing the thickness of the anti-reflection structure; in the anti-reflection structure according to the embodiment of the present disclosure, there is further provided a light cutoff layer, configured to cut off light which is not conducive to improving the degree of polarization, so as to obtain a higher degree of polarization while reducing the thickness of the anti-reflection structure.

Hereinafter, the anti-reflection structure and the fabrication method thereof, the display and the fabrication method thereof provided by the embodiment of the present disclosure will be described in detail in conjunction with the drawings, so that the technical solutions of the present disclosure will become clearer.

Embodiment One

This embodiment provides an anti-reflection structure. As shown in FIG. 1a, it is a structural schematic diagram of the anti-reflection structure, and the anti-reflection structure 101 includes sequentially: a retardation film 102; a first alignment layer 103 and a linear polarizer sheet 104. The first alignment layer 103 is provided on a light emergent side of the retardation film 102; and the linear polarizer sheet 104 is provided on a light emergent side of the first alignment layer 103, wherein, the retardation film and the linear polarizer sheet include liquid crystal.

It should be noted that, the light emergent side here is with respect to display light; in a light emergent direction of the display light, the light emergent side refers to a side from which the display light is emitted out, and a corresponding light incident side, as described below, refers to a side onto which the display light is incident; as shown in FIG. 1, L1 indicates a light emergent direction of the display light.

Exemplarily, the liquid crystal included in the retardation film and the linear polarizer sheet can be a polymerizable liquid crystal, the linear polarizer sheet 104 can include a dichroic dye, a polymerizable liquid crystal and a photoinitiator, and the retardation film 102 can include a polymerizable liquid crystal and a photoinitiator. Among them, the dichroic dye can be X11 (BASF) or S-428; the polymerizable liquid crystal can be an ordinary nematic liquid crystal such as LC242 (merck), and the photoinitiator can be 184.

Exemplarily, the linear polarizer sheet 104 can include a dichroic dye in a mass percentage of 1% to 20%, a polymerizable liquid crystal in a mass percentage of 75% to 95% and a photoinitiator in a mass percentage of 0.1% to 5%. Alternatively, percentage contents of the dichroic dye, the polymerizable liquid crystal and the photoinitiator are 10%, 87.5% and 2.5%, respectively.

Exemplarily, the retardation film 102 can include a polymerizable liquid crystal in a weight percentage of 75% to 99.5% and a photoinitiator in a weight percentage of 0.5% to 25%.

Exemplarily, in order to enable the linear polarizer sheet 104 including a liquid crystal material to transmit polarized light in one direction and absorb the polarized light in a direction perpendicular thereto the one direction, it needs to be aligned during formation, and the retardation film 102 including the liquid crystal material also needs to be aligned during formation. Alternatively, the linear polarizer sheet 104 and the retardation film 102 can both be aligned by the first alignment layer 103 located therebetween; or the linear polarizer sheet 104 and the retardation film 102 can be aligned respectively by different alignment layers.

Exemplarily, the first alignment layer 103 can be configured to align the retardation film 102; and in this case, the anti-reflection structure can further include a second alignment layer 109, the second alignment layer 109 is provided on a light emergent side of the linear polarizer sheet 104, and the second alignment layer 109 is configured to align the linear polarizer sheet 104. Alternatively, the first alignment layer 103 can also be configured to align the linear polarizer sheet 104; and in this case, the anti-reflection structure 101 can include a third alignment layer 130, the third alignment layer 130 is provided on a light incident side of the retardation film 102, and is configured to align the retardation film 102.

In this embodiment, both the linear polarizer sheet and the retardation film of the anti-reflection structure are made of the liquid crystal material, for example, formed by using a coating method. Therefore, as compared with the conventional anti-reflection structure used in a display device, the thickness of the anti-reflection structure according to the embodiment of the present disclosure can be significantly reduced, for example, the thickness can be reduced to about 10 μm, even far less than 10 μm, for example, 5.27 μm as given in an example below. However, for the above-described anti-reflection structure, its degree of polarization may be lower, which is, for example, 60%.

Alternatively, the anti-reflection structure according to the embodiment of the present disclosure can further includes a light cutoff layer, and the light cutoff layer is provided on the light emergent side of the linear polarizer sheet and configured to cut off light with a wavelength in a specific range. Alternatively, the light cutoff layer 108 can further be provided on a light emergent side of the second alignment layer 109.

Exemplarily, thicknesses of the first alignment layer 103, the second alignment layer 109 and the third alignment layer 130 can be all in a range of 0.05 μm to 0.15 μm, for example, can all be 0.1 μm.

Exemplarily, a thickness of the linear polarizer sheet 104 can be 2.5 μm to 3.5 μm, for example, 3 μm.

Exemplarily, a thickness of the retardation film 102 can be 1.5 μm to 2.5 μm, for example, 2 μm.

Exemplarily, a thickness of the light cutoff layer 108 can be 0.06 μm to 0.08 μm, for example, 0.07 μm.

Exemplarily, for an example of the anti-reflection structure according to the embodiment of the present disclosure, for example, the anti-reflection structure includes sequentially the retardation film, the first alignment layer, the linear polarizer sheet, the second alignment layer, and the light cutoff layer. When the thickness of the light cutoff layer 108 is, for example, 0.07 μm, the thicknesses of the two alignment layers are, for example, both 0.1 μm, the thickness of the linear polarizer sheet 104 is, for example, 3 μm, and the thickness of the retardation film 103 is, for example, 2 μm, a total thickness of the anti-reflection structure is 5.27 μm, which is less than 10 μm, and the thickness is significantly reduced as compared with that of the conventional anti-reflection structure with a thickness of about 120 μm to 250 μm, and the anti-reflection structure having the structure can have its degree of polarization raised to 99.7%, which is advantageous to implement ultrathin display.

Exemplarily, the light cutoff layer 108 can be configured to cut off light with a wavelength in a specific range, for example, cut off light with a wavelength in a range of 650 nm to 780 nm, preferably, cut off light with a wavelength in a range of 700 nm to 780 nm, and thus, only a portion of infrared light, rather than all of the infrared light, can be cut off, so that the degree of polarization can be improved greatly, and display will not be affected.

In this way, by providing the light cutoff layer 108, its filtering effect greatly improves the degree of polarization, so that it is possible to implement the anti-reflection structure having a high degree of polarization while reducing the thickness, which thus, can be well used in the display, to implement ultra-thin flexible display.

Exemplarily, the light cutoff layer 108 according to the embodiment of the present disclosure can include a plurality of high refractive index layers and a plurality of low refractive index layers arranged alternately; thicknesses of the respective high refractive index layers can be equal or unequal, thicknesses of the respective low refractive index layers can also be equal or unequal, and the thickness of the high refractive index layer can also be equal or unequal to the thickness of the low refractive index layer, which will not be limited in the embodiments of the present disclosure.

For example, the high refractive index layer can be a silicon nitride layer, and the low refractive index layer can be a silicon oxide layer; that is, the light cutoff layer 108 can include a plurality of silicon nitride layers and a plurality of silicon oxide layers arranged alternately. For example, the silicon nitride layer and the silicon oxide layer can be alternately deposited by using a plasma enhanced chemical vapor deposition (PECVD) method, wherein a reaction gas for depositing the silicon nitride layer can be a mixed gas of $SiH_4$, $NH_3$ and $N_2$, for example, in the mixed gas, a flow rate of $SiH_4$, $NH_3$ and $N_2$ can be 16:4:1; a reaction gas for depositing the silicon oxide layer can be a mixed gas of $SiH_4$, $NO_2$ and $N_2$, for example, in the mixed gas, a flow rate of $SiH_4$, $NH_3$ and $N_2$ can be 40:4:1. In practice, a thickness of a film layer can be controlled by controlling reaction time, and multilayer film alternate deposition is implemented by opening and closing a reaction gas path.

Here, it should be noted that, the retardation film according to the embodiment of the present disclosure can be a λ/4 wave plate, λ can be an average value of wavelengths of visible light, or can be set by those skilled in the art according to actual needs, which will not be limited in the embodiments of the present disclosure.

For the anti-reflection structure according to the embodiment of the present disclosure, both the linear polarizer sheet and the retardation film are made of the liquid crystal material, for example, can be formed by using a coating method, so that, as compared with the conventional anti-reflection structure used in the display, the thickness of the anti-reflection structure can be significantly reduced; and it further comprises the light cutoff layer 108 which cuts off light with the wavelength in the range of 650 nm to 780 nm, so that light which has a disadvantageous effect on the degree of polarization of the anti-reflection structure is completely or partly cut off, so that the degree of polarization of the anti-reflection structure can be significantly improved, for example, the degree of polarization of the anti-reflection structure can be improved from 60% to 99.7%, so as to achieve the anti-reflection structure whose thickness is significantly reduced and whose degree of polarization is significantly improved, which is suitable for implementing ultra-thin flexible display.

Embodiment Two

Figure 1B:
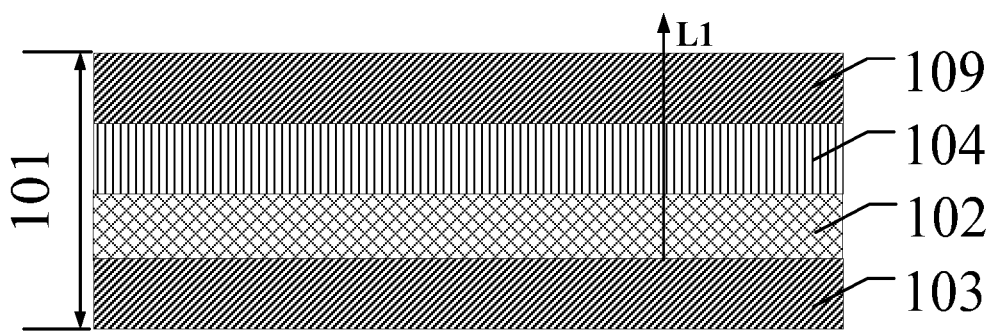

This embodiment provides another anti-reflection structure. As shown in FIG. 1b, it is a structural schematic diagram of the anti-reflection structure, and the anti-reflection structure 101 includes sequentially: a first alignment layer 103, a retardation film 102, a linear polarizer sheet 104 and a second alignment layer 109. The first alignment layer 103 is provided on a light incident side of the retardation film 102; the linear polarizer sheet 104 is provided on a light emergent side of the retardation film 102, wherein, the retardation film and the linear polarizer sheet include liquid crystal.

It should be noted that, the light emergent side here is with respect to display light; in a light emergent direction of the display light, the light emergent side refers to a side from which the display light is emitted out, and a corresponding light incident side, as described below, refers to a side onto which the display light is incident; as shown in FIG. 1, L1 indicates a light emergent direction of the display light Exemplarily, the liquid crystal included in the retardation film and the linear polarizer sheet can be a polymerizable liquid crystal, the linear polarizer sheet 104 can include a dichroic dye, a polymerizable liquid crystal and a photoinitiator, and the retardation film 102 can include a polymerizable liquid crystal and a photoinitiator. Among them, the dichroic dye can be X11 (BASF) or S-428; the polymerizable liquid crystal can be an ordinary nematic liquid crystal such as LC242 (merck), and the photoinitiator can be 184.

Exemplarily, the linear polarizer sheet 104 can include a dichroic dye in a mass percentage of 1% to 20%, a polymerizable liquid crystal in a mass percentage of 75% to 95% and a photoinitiator in a mass percentage of 0.1% to 5%. Alternatively, percentage contents of the dichroic dye, the polymerizable liquid crystal and the photoinitiator are 10%, 87.5% and 2.5%, respectively.

Exemplarily, the retardation film 102 can include a polymerizable liquid crystal in a weight percentage of 75% to 99.5% and a photoinitiator in a weight percentage of 0.5% to 25%.

Alternatively, the anti-reflection structure according to the embodiment of the present disclosure can further comprise a light cutoff layer, and the light cutoff layer is provided on the light emergent side of the linear polarizer sheet and configured to cut off light with a wavelength in a specific range. Alternatively, the light cutoff layer 108 can further be provided on a light emergent side of the second alignment layer 109.

Exemplarily, thicknesses of the first alignment layer 103 and the second alignment layer 109 can be respectively in a range of 0.05 μm to 0.15 μm, for example, can both be 0.1 μm.

Exemplarily, a thickness of the linear polarizer sheet 104 can be 2.5 μm to 3.5 μm, for example, 3 μm.

Exemplarily, a thickness of the retardation film 102 can be 1.5 μm to 2.5 μm, for example, 2 μm.

Exemplarily, a thickness of the light cutoff layer 108 can be 0.06 μm to 0.08 μm, for example, 0.07 μm.

Exemplarily, the light cutoff layer 108 can be configured to cut off light with a wavelength in a specific range, for example, cut off light with a wavelength in a range of 650 nm to 780 nm, preferably, cut off light with a wavelength in a range of 700 nm to 780 nm, and thus, only a portion of infrared light can be cut off, other than all the infrared light, so that the degree of polarization can be improved greatly, and display will not be affected.

In this way, by providing the light cutoff layer 108, its filtering effect greatly improves the degree of polarization, so that it is possible to implement the anti-reflection structure having a high degree of polarization while reducing the thickness, which thus, can be well used in the display, to implement ultra-thin flexible display.

Exemplarily, the light cutoff layer 108 according to the embodiment of the present disclosure can include a plurality of high refractive index layers and a plurality of low refractive index layers arranged alternately, thicknesses of the respective high refractive index layers can be equal or unequal; thicknesses of the respective low refractive index layers can also be equal or unequal; the thickness of the high refractive index layer can also be equal or unequal to the thickness of the low refractive index layer, which will not be limited in the embodiments of the present disclosure.

For example, the high refractive index layer can be a silicon nitride layer, and the low refractive index layer can be a silicon oxide layer, that is, the light cutoff layer 108 can include a plurality of silicon nitride layers and a plurality of silicon oxide layers arranged alternately. For example, the silicon nitride layer and the silicon oxide layer can be alternately deposited by using a plasma enhanced chemical vapor deposition (PECVD) method, wherein a reaction gas for depositing the silicon nitride layer can be a mixed gas of $SiH_4$, $NH_3$ and $N_2$, for example, in the mixed gas, a flow rate of $SiH_4$, $NH_3$ and $N_2$ can be 16:4:1; a reaction gas for depositing the silicon oxide layer can be a mixed gas of $SiH_4$, $NO_2$ and $N_2$, for example, in the mixed gas, a flow rate of $SiH_4$, $NH_3$ and $N_2$ can be 40:4:1. In practice, a thickness of a film layer can be controlled by controlling reaction time, and multilayer film alternate deposition is implemented by opening and closing a reaction gas path.

Here, it should be noted that, the retardation film according to the embodiment of the present disclosure can be a λ/4 wave plate, λ can be an average value of wavelengths of visible light, or can be set by those skilled in the art according to actual needs, which will not be limited in the embodiments of the present disclosure.

For the anti-reflection structure according to the embodiment of the present disclosure, both the linear polarizer sheet and the retardation film are made of the liquid crystal material, for example, can be formed by using a coating method, so that, as compared with the conventional anti-reflection structure used in the display, the thickness of the anti-reflection structure can be significantly reduced; and it further comprises the light cutoff layer 108 which cuts off light with the wavelength in the range of 650 nm to 780 nm, so that light which has a disadvantageous effect on the degree of polarization of the anti-reflection structure is completely or partly cut off, so that the degree of polarization of the anti-reflection structure can be significantly improved, for example, the degree of polarization of the anti-reflection structure can be improved from 60% to 99.7%, so as to implement the anti-reflection structure whose thickness is significantly reduced and whose degree of polarization is significantly improved, which is suitable for implementing ultra-thin flexible display.

Embodiment Three

This embodiment provides a fabrication method of the anti-reflection structure as described in Embodiment One and Embodiment Two, and hereinafter, the fabrication method of the anti-reflection structure according to the embodiment of the present disclosure is described with fabrication of the anti-reflection structure according to Embodiment One as an example.

Exemplarily, the fabrication method of the anti-reflection structure according to the embodiment of the present disclosure comprises:

Preparing a substrate;

Forming a retardation film, a first alignment layer and a linear polarizer sheet on the substrate, Wherein, the first alignment layer is located between the retardation film and the linear polarizer sheet, and the retardation film and the linear polarizer sheet include liquid crystal.

Alternatively, in the fabrication method of the anti-reflection structure according to this embodiment, the forming a retardation film, a first alignment layer and a linear polarizer sheet on the substrate can include: forming the retardation film on the substrate; forming the first alignment layer on the retardation film; and forming the linear polarizer sheet on the first alignment layer.

Alternatively, in the fabrication method of the anti-reflection structure according to this embodiment, the forming a retardation film, a first alignment layer and a linear polarizer sheet on the substrate includes: forming the linear polarizer sheet on the substrate; forming the first alignment layer on the linear polarizer sheet; and forming the retardation film on the first alignment layer.

Further, for an exemplary step of forming the retardation film, the alignment layer, and the linear polarizer sheet as described above, a fabrication method of a display according to Embodiment Four below can be referred to, which will not be repeated here.

It should be noted by those skilled in the art that, the fabrication method of the respective components described herein is also adaptable to fabrication of the anti-reflection structure as described in Embodiment Two, it is only necessary to change the order of the respective steps, and for simplicity, its specific description is omitted here.

Embodiment Three

Figure 2:
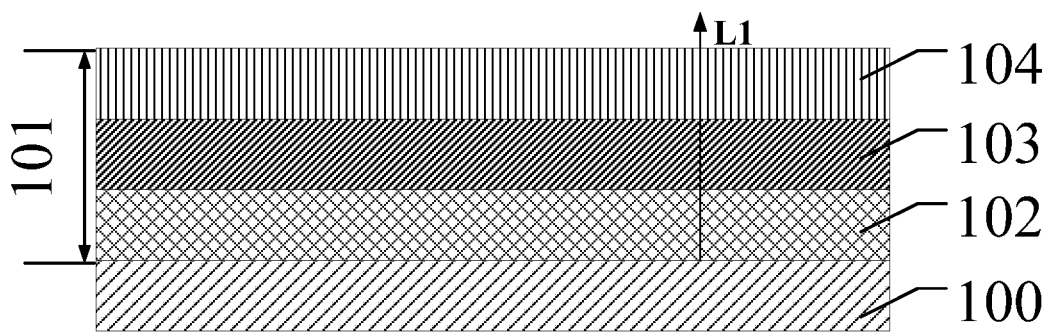
FIG. 2 is a structural schematic diagram of a display device including an anti-reflection structure according to an embodiment of the present disclosure.

This embodiment provides a display device. As shown in FIG. 2, it is a structural schematic diagram of the display device with an anti-reflection structure, and the display device includes: a display panel 100 and an anti-reflection structure 101, wherein the anti-reflection structure 101 includes sequentially: a retardation film 102, a first alignment layer 103 and a linear polarizer sheet 104. The first alignment layer 103 is provided on a light emergent side of the retardation film 102; and the linear polarizer sheet 104 is provided on a light emergent side of the first alignment layer 103. In an example shown in FIG. 2, the anti-reflection structure 101 is provided on a light emergent side of the display panel 100, but beside the example shown in FIG. 2, the anti-reflection structure 101 can also be provided inside the display panel 100.

Figure 3:
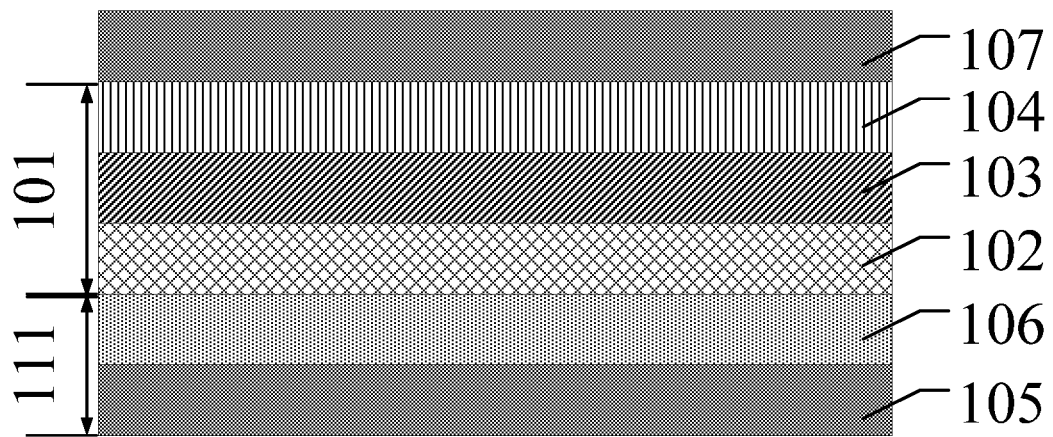
FIG. 3 is a structural schematic diagram of a display device in which an anti-reflection structure is provided inside a display panel according to an embodiment of the present disclosure.

It should be noted that, the light emergent side here is with respect to display light; in a light emergent direction of the display light, the light emergent side refers to a side from which the display light is emitted out, and a corresponding light incident side, as described below, refers to a side onto which the display light is incident; as shown in FIG. 2, L1 indicates a light emergent direction of the display light For example, as shown in FIG. 3, the display device with an anti-reflection structure provided inside the display panel according to the embodiment of the present disclosure is shown. The display panel 100 in the display includes: an array substrate 111 and a counter substrate 107, wherein, the array substrate 111 includes: a base substrate 105 and a plurality of pixel units 106. The plurality of pixel units 106 are formed on the base substrate 105, and each of the plurality of pixel units 106 has an organic light emitting diode and a thin film transistor formed therein; the counter substrate 107 is assembled with the array substrate 111 on the light emergent side of the plurality of pixel units 106, wherein, the anti-reflection structure 101 is provided between the array substrate 111 and the counter substrate 107. In FIG. 3, the anti-reflection structure 101 is provided between the counter substrate 107 and the array substrate 111; alternatively, the anti-reflection structure 101 can also be provided on a side of the counter substrate opposite to the array substrate.

Figure 4A:
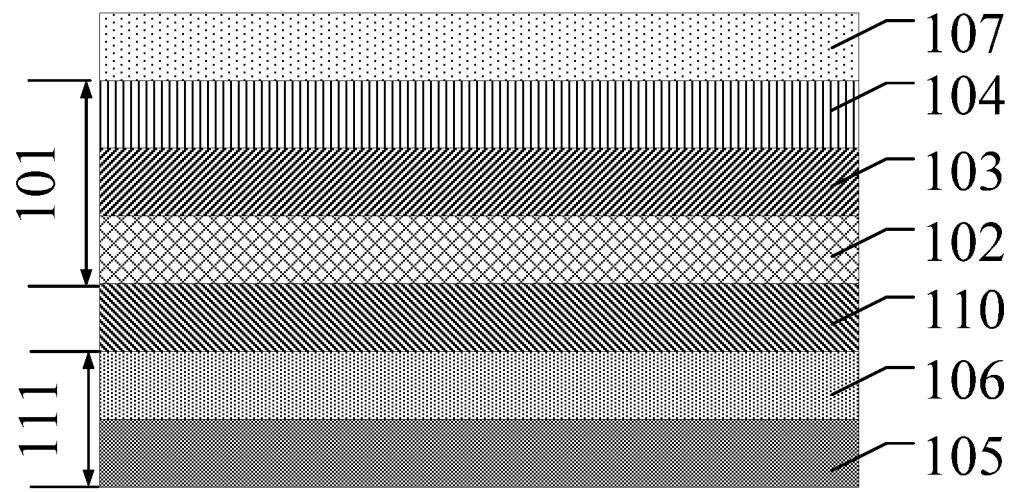
FIG. 4a is a structural schematic diagram of a display device in which an anti-reflection structure is provided on a base substrate according to an embodiment of the present disclosure.

For example, as shown in FIG. 4a, the anti-reflection structure 101 is provided between the counter substrate 107 and the array substrate 111, the plurality of pixel units 106 are formed on the base substrate 105, and each of the plurality of pixel units 106 has the organic light emitting diode and the thin film transistor formed therein, and the anti-reflection structure 101 is formed on the base substrate with the plurality of pixel units 106 formed thereon. Alternatively, a planarization layer 110 can be also formed between the anti-reflection structure 101 and the base substrate 105 with the organic light emitting diode and the thin film transistor formed thereon, and the planarization layer 110 can be made of a known material, by using a reverse etching method, a glass reflow method, a spin-coating glass method, a chemical mechanical planarization method, and the like.

Figure 4B:
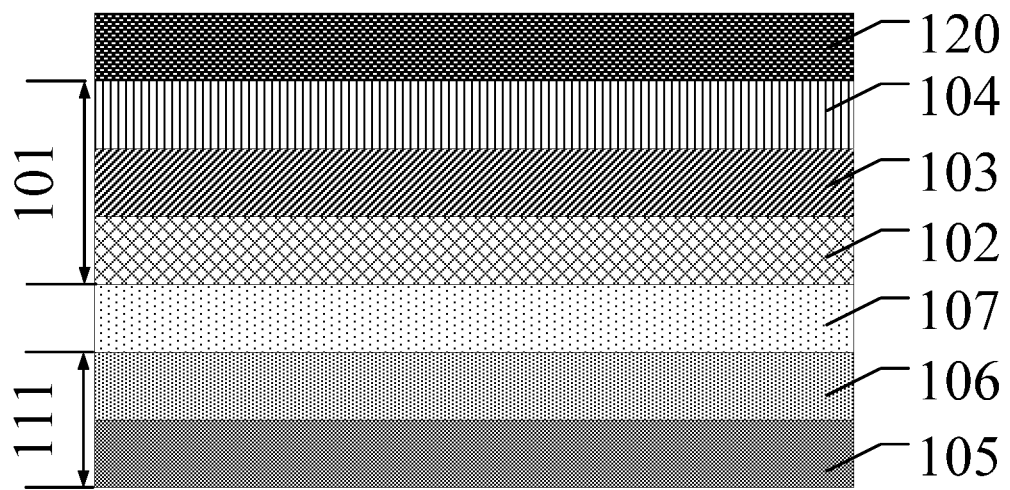
FIG. 4b is a structural schematic diagram of a display device in which an anti-reflection structure is provided on a counter substrate according to an embodiment of the present disclosure.

Exemplarily, as shown in FIG. 4b, the anti-reflection structure 101 can further be provided on the side of the counter substrate 107 opposite to the array substrate 111, wherein, the plurality of pixel units 106 are formed on the base substrate 105, and each of the plurality of pixel units 106 has the organic light emitting diode and the thin film transistor formed therein. The anti-reflection structure 101 can further include a protective layer 120 on the light emergent side of the linear polarizer sheet 104, which is configured to protect the anti-reflection structure 101; for example, the protective layer 120 can be made of a transparent insulating material.

Exemplarily, the linear polarizer sheet 104 can include a dichroic dye, a polymerizable liquid crystal and a photoinitiator, and the retardation film 102 can include a polymerizable liquid crystal and a photoinitiator. Among them, the dichroic dye can be X11 (BASF) or S-428; the polymerizable liquid crystal can be an ordinary nematic liquid crystal such as LC242 (merck), and the photoinitiator can be 184.

Exemplarily, the linear polarizer sheet 104 can include a dichroic dye in a mass percentage of 1% to 20%, a polymerizable liquid crystal in a mass percentage of 75% to 95% and a photoinitiator in a mass percentage of 0.1% to 5%. Alternatively, percentage contents of the dichroic dye, the polymerizable liquid crystal and the photoinitiator are 10%, 87.5% and 2.5%, respectively.

Exemplarily, the retardation film 102 can include a polymerizable liquid crystal in a weight percentage of 75% to 99.5% and a photoinitiator in a weight percentage of 0.5% to 25%.

Exemplarily, in order to enable the linear polarizer sheet 104 including a liquid crystal material to transmit polarized light in one direction and absorb the polarized light in a direction perpendicular the one direction, it needs to be aligned during formation. The retardation film 102 including the liquid crystal material also needs to be aligned during formation. Alternatively, the linear polarizer sheet 104 and the retardation film 102 can be commonly aligned by the first alignment layer 103 located therebetween; or the linear polarizer sheet 104 and the retardation film 102 can be aligned respectively with different alignment layers.

Figure 4C:
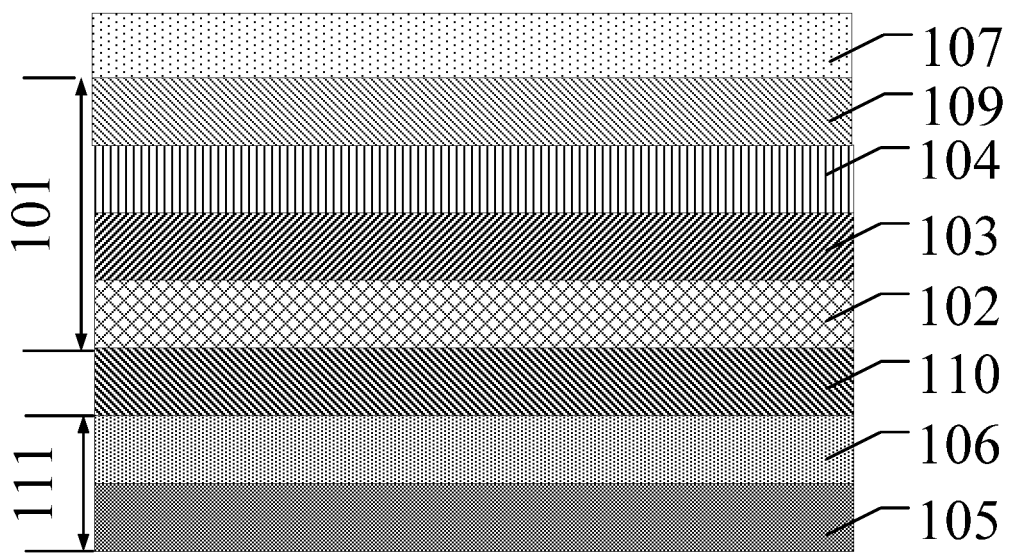
FIG. 4c is another structural schematic diagram of a display device in which an anti-reflection structure is provided on a base substrate according to an embodiment of the present disclosure.
Figure 4D:
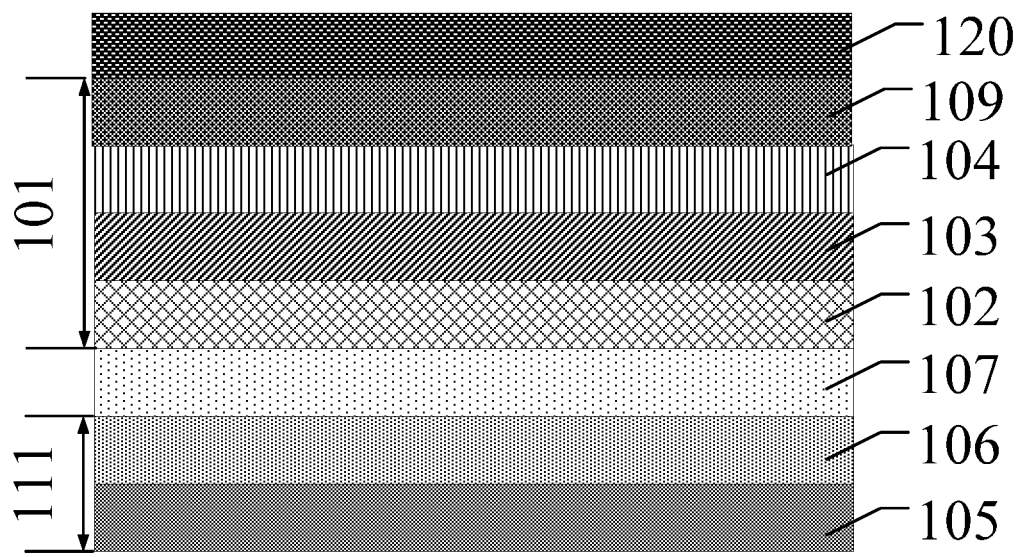
FIG. 4d is another structural schematic diagram of a display device in which an anti-reflection structure is provided on a counter substrate according to an embodiment of the present disclosure.

Exemplarily, the first alignment layer 103 can be configured to align the retardation film 102, and in this case, the anti-reflection structure can further include a second alignment layer 109, the second alignment layer 109 is provided on a light emergent side of the linear polarizer sheet 104, and the second alignment layer 109 is configured to align the linear polarizer sheet 104. As shown in FIG. 4c, corresponding to a structure of the display device shown in FIG. 4a, the second alignment layer 109 can be provided between the counter substrate 107 and the linear polarizer sheet 104; alternatively, as shown in FIG. 4d, corresponding to the display device shown in FIG. 4b, the second alignment layer 109 can be provided between the protective layer 120 and the linear polarizer sheet 104.

Figure 4E:
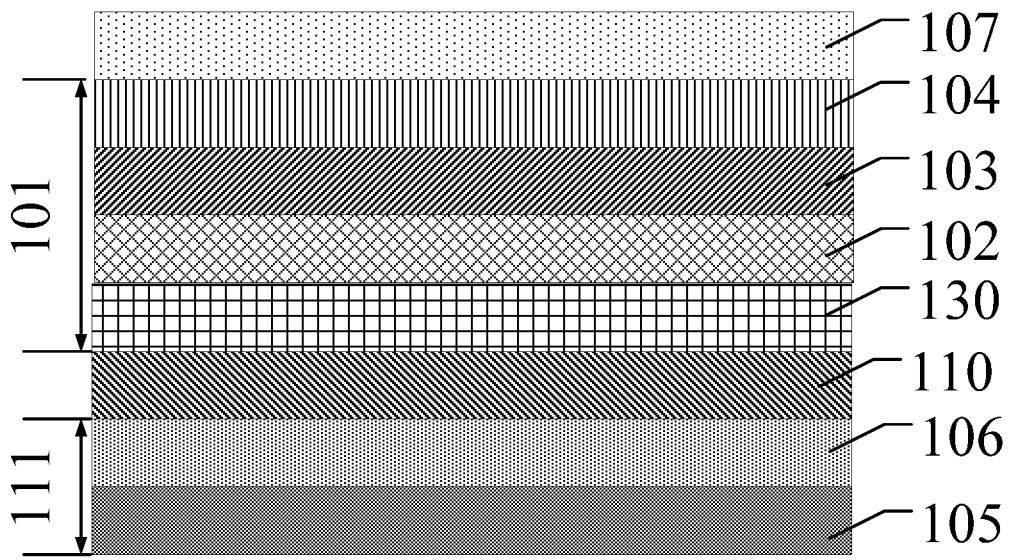
FIG. 4e is a yet another structural schematic diagram of a display device in which an anti-reflection structure is provided on a base substrate according to an embodiment of the present disclosure.

Alternatively, the first alignment layer 103 can also be configured to align the linear polarizer sheet 104, and in this case, the anti-reflection structure 101 can include a third alignment layer 130, the third alignment layer 130 is provided on a light incident side of the retardation film 102, and is configured to align the retardation film 102. For example, corresponding to an implementation mode in which the anti-reflection structure 101 is formed between the counter substrate and the array substrate, the third alignment layer 130 is provided between the planarization layer 110 on the array substrate with the organic light emitting diode and the thin film transistor formed thereon and the retardation film 102, as shown in FIG. 4e. Alternatively, corresponding to an implementation mode in which the anti-reflection structure 101 is formed on the side of the counter substrate opposite to the array substrate, the third alignment layer 130 is provided between the counter substrate and the retardation film 102.

In this embodiment, both the linear polarizer sheet and the retardation film of the anti-reflection structure are made of liquid crystal material, for example, formed by using a coating method. Thus, as compared with the conventional anti-reflection structure used in a display device, the thickness of the anti-reflection structure according to the embodiment of the present disclosure can be significantly reduced, for example, the thickness can be reduced to about 10 μm, even far less than 10 μm, for example, 5.27 μm as given in an example below. However, for the above-described anti-reflection structure, its degree of polarization may be lower, which is, for example, 60%.

Figure 5:
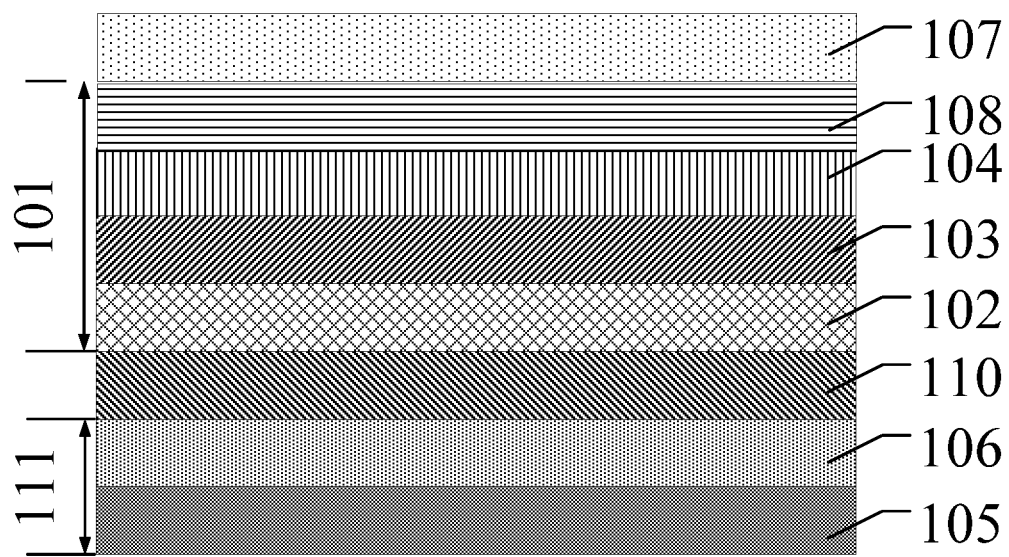
FIG. 5 is a cross-sectional structural diagram of a display device according to an embodiment of the present disclosure.

Alternatively, in order to improve a degree of polarization of the above-described display device, the anti-reflection structure according to the embodiment of the present disclosure can further include a light cutoff layer, and the light cutoff layer is provided on the light emergent side of the linear polarizer sheet and configured to cut off light with a wavelength in a specific range. For example, as shown in FIG. 5, corresponding to the display device shown in FIG. 4a, the retardation film 102, the first alignment layer 103 and the linear polarizer sheet 104 are sequentially provided on the planarization layer 110, and the light cutoff layer 108 is formed on the light emergent side of the linear polarizer sheet 104. Alternatively, corresponding to a structure of the display device shown in FIG. 4a and FIG. 4d, the light cutoff layer 108 can be provided on a light emergent side of the second alignment layer 109.

Exemplarily, thicknesses of the first alignment layer 103, the second alignment layer 109 and the third alignment layer 130 can be respectively in a range of 0.05 μm to 0.15 μm, for example, can all be 0.1 μm.

Exemplarily, a thickness of the linear polarizer sheet 104 can be 2.5 μm to 3.5 μm, for example, 3 μm.

Exemplarily, a thickness of the retardation film 102 can be 1.5 μm to 2.5 μm, for example, 2 μm.

Exemplarily, a thickness of the light cutoff layer 108 can be 0.06 μm to 0.08 μm, for example, 0.07 μm.

Exemplarily, for an example of the anti-reflection structure according to the embodiment of the present disclosure, for example, the anti-reflection structure includes sequentially the retardation film, the first alignment layer, the linear polarizer sheet, the second alignment layer, and the light cutoff layer; when the thickness of the light cutoff layer 108 is, for example, 0.07 μm, the thicknesses of the two alignment layers are, for example, both 0.1 μm, the thickness of the linear polarizer sheet 104 is, for example, 3 μm, and the thickness of the retardation film 103 is, for example, 2 μm, a total thickness of the anti-reflection structure is 5.27 μm, which is less than 10 μm, and the thickness is significantly reduced as compared with that of the conventional anti-reflection structure with a thickness of about 120 μm to 250 μm, and the anti-reflection structure having the structure can have its degree of polarization raised to 99.7%, which is advantageous to implement ultrathin display.

Hereinafter, a light cut-off characteristic of the light cutoff layer 108 will be exemplarily described in conjunction with FIG. 6.

Figure 6:
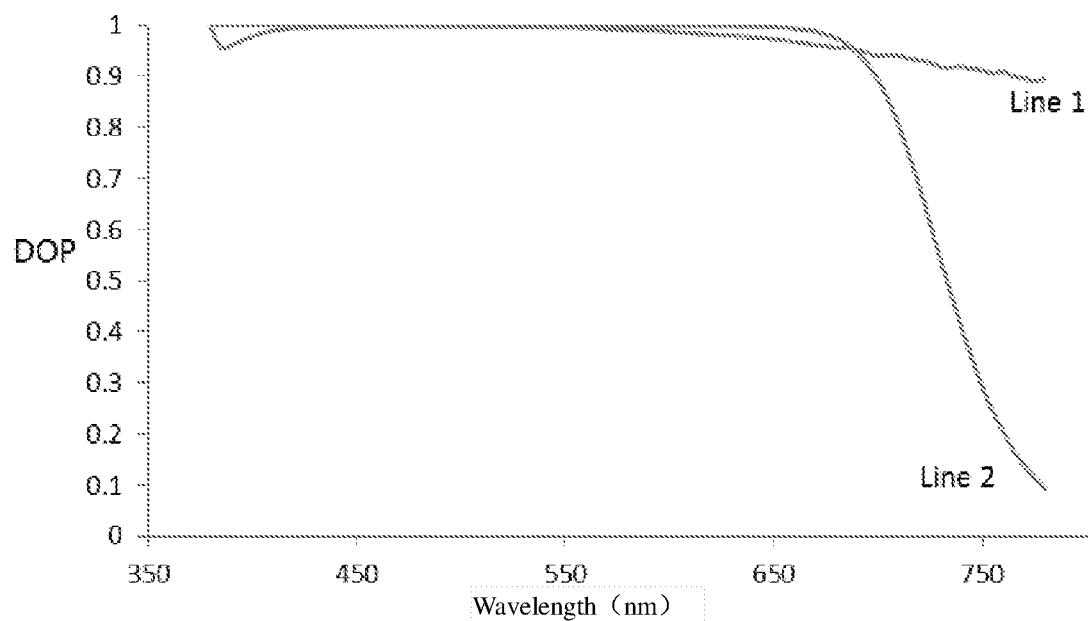
FIG. 6 is a schematic diagram of relationship between a degree of polarization of an anti-reflection structure and an incident light wavelength.

As shown in FIG. 6, relationship between a degree of polarization of the anti-reflection structure and an incident light wavelength is shown, where, an abscissa represents the incident light wavelength, an ordinate represents the degree of polarization (DOP). The line Line 1 shows relationship between the degree of polarization of the conventional anti-reflection structure of mass production attached to the outside of the display panel and the incident light wavelength obtained by a test, while the line Line 2 shows relationship between the degree of polarization of the anti-reflection structure without a light cutoff layer according to the embodiment of the present disclosure and the incident light wavelength obtained by a test. As can be seen from FIG. 6, with respect to the anti-reflection structure without a light cutoff layer according to the embodiment of the present disclosure, when the incident light wavelength is in a range of 380 nm to 780 nm, an average degree of polarization is only 60%, wherein, when it is in a range of 380 nm to 650 nm, the average degree of polarization is close to 1, about 99.75%, and when the incident light wavelength is greater than 650 nm, the degree of polarization decreases sharply, and thus, it can be known that, light with a wavelength of 650 nm to 780 nm seriously affects the degree of polarization of the anti-reflection structure, and thus, the light cutoff layer 108 according to the embodiment of the present disclosure can be configured to cut off light in the range of 650 nm to 780 nm, so as to improve the degree of polarization.

Exemplarily, the light cutoff layer 108 can be configured to cut off light with a wavelength in a specific range, for example, cut off light with a wavelength in a range of 650 nm to 780 nm, preferably, cut off light with a wavelength in a range of 700 nm to 780 nm, and thus, only a portion of infrared light can be cut off, rather than all the infrared light, so that the degree of polarization can be improved greatly, and display will not be affected.

In this way, by providing the light cutoff layer 108, its filtering effect greatly improves the degree of polarization, so that it is possible to implement the anti-reflection structure having a high degree of polarization while reducing the thickness, which thus, can be well used in the display, to implement ultra-thin flexible display.

Exemplarily, the light cutoff layer 108 according to the embodiment of the present disclosure can include a plurality of high refractive index layers and a plurality of low refractive index layers arranged alternately; thicknesses of the respective high refractive index layers can be equal or unequal, thicknesses of the respective low refractive index layers can also be equal or unequal, and the thickness of the high refractive index layer can also be equal or unequal to the thickness of the low refractive index layer, which will not be limited in the embodiments of the present disclosure.

For example, the high refractive index layer can be a silicon nitride layer, and the low refractive index layer can be a silicon oxide layer, that is, the light cutoff layer 108 can include a plurality of silicon nitride layers and a plurality of silicon oxide layers arranged alternately. For example, the silicon nitride layer and the silicon oxide layer can be alternately deposited by using a plasma enhanced chemical vapor deposition (PECVD) method, wherein a reaction gas for depositing the silicon nitride layer can be a mixed gas of $SiH_4$, $NH_3$ and $N_2$, for example, in the mixed gas, a flow rate of $SiH_4$, $NH_3$ and $N_2$ can be 16:4:1; a reaction gas for depositing the silicon oxide layer can be a mixed gas of $SiH_4$, $NO_2$ and $N_2$, for example, in the mixed gas, a flow rate of $SiH_4$, $NH_3$ and $N_2$ can be 40:4:1. In practice, a thickness of a film layer can be controlled by controlling reaction time, and multilayer film alternate deposition is implemented by opening and closing a reaction gas path.

Hereinafter, a specific example of the light cutoff layer is given below. Here, the light cutoff layer is formed by alternately depositing a silicon nitride layer and a silicon oxide layer, for example, the resultant light cutoff layer is formed to have a structure of $0.66H|(1L1H)^4|1L$, wherein, H represents a silicon nitride layer, L represents a silicon oxide layer, and coefficients 0.66 and 1 represent a thickness of each layer, here, with respect to the silicon nitride layer, the coefficient 1 represents 36 nm, then 0.66H represents a silicon nitride layer with a thickness of 36×0.66 nm=23.76 nm, and with respect to the silicon oxide layer, the coefficient 1 represents 52 nm, then 1L represents a silicon oxide layer with a thickness of 52 nm. For example, $(1L1H)^4$ indicates that silicon oxide, with a thickness of 52 nm, and silicon nitride, with a thickness of 36 nm, are deposited 4 times successively, for example, the number of times for alternating the layers can also be 8 times, 16 times, 32 times, and so on.

Figure 7:
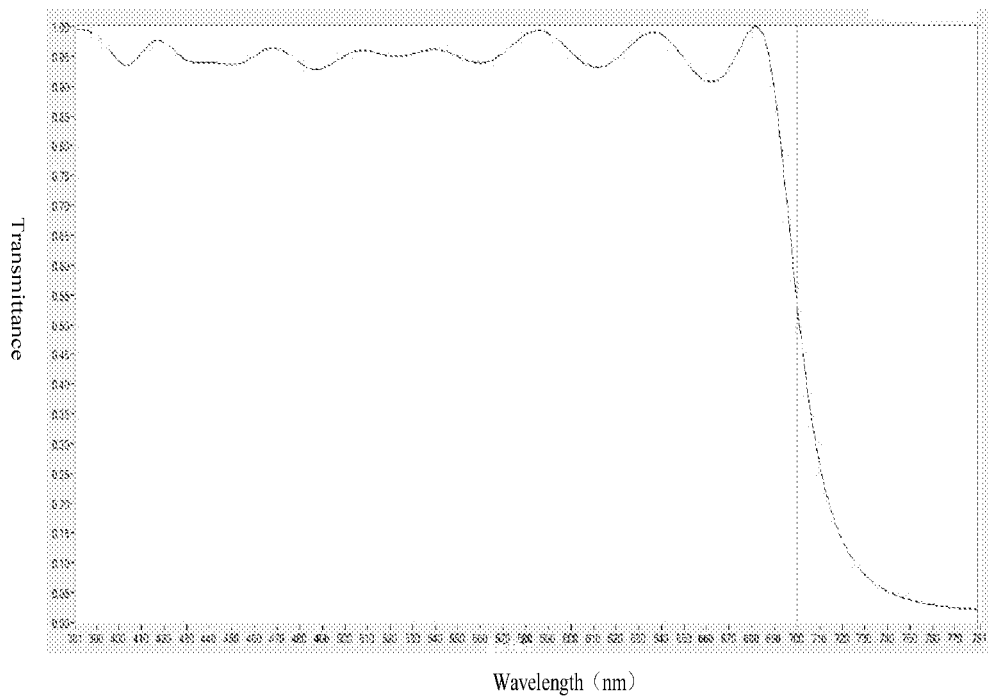
FIG. 7 is a curve chart of transmittance of a light cutoff layer according to an embodiment of the present disclosure.

FIG. 7 gives a curve chart of transmittance of an exemplary light cutoff layer obtained by simulation, as shown in FIG. 7, the light cutoff layer has 16 film layers, a silicon nitride layer and a silicon oxide layer are alternately stacked 8 times, whose specific structure is: 1.15H, 1.07L, 1.10H, 1.14L, 0.99H, 1.09L, 1.11H, 1.11L, 1.17H, 0.58L, 1.26H, 1.15L, 0.99H, 1.14L, 0.98H and 0.46L, to constitute a light cutoff layer with a total thickness of 717 nm. As can be seen from the diagram, with respect to light with a wavelength of 380 nm to 700 nm, for example, 380 nm to 650 nm, the transmittance of the light cutoff layer of such a structure is more than 95%.

Here, it should be noted that, the retardation film according to the embodiment of the present disclosure can be a λ/4 wave plate, λ can be an average value of wavelengths of visible light, or can be set by those skilled in the art according to actual needs, which will not be limited in the embodiments of the present disclosure.

For the anti-reflection structure according to the embodiment of the present disclosure, both the linear polarizer sheet and the retardation film are made of liquid crystal material, for example, can be formed by using a coating method. Therefore, as compared with the conventional anti-reflection structure used in the display device, the thickness of the anti-reflection structure can be significantly reduced; and it further includes the light cutoff layer 108 which cuts off light with the wavelength in the range of 650 nm to 780 nm, so that light which has a disadvantageous effect on the degree of polarization of the anti-reflection structure is completely or partly cut off, and the degree of polarization of the anti-reflection structure can be significantly improved; for example, the degree of polarization of the anti-reflection structure can be improved from 60% to 99.7%, so as to achieve the anti-reflection structure whose thickness is significantly reduced and whose degree of polarization is significantly improved, which is suitable for implementing ultra-thin flexible display.

Embodiment Four

This embodiment provides a fabrication method of a display device. The fabrication method includes: providing a display panel and fabricating an anti-reflection structure, wherein the display panel includes an array substrate and a counter substrate assembled with each other, the array substrate includes: a base substrate and a plurality of pixel units, formed on the base substrate, and each of the plurality of pixel units having an organic light emitting diode and a thin film transistor formed therein, the counter substrate is provided on a light emergent side of the plurality of pixel units; wherein the fabricating an anti-reflection structure includes: forming a retardation film, a first alignment layer and a linear polarizer sheet on the base substrate with the organic light emitting diode and the thin film transistor formed thereon or on the counter substrate, the first alignment layer being located between the retardation film and the linear polarizer sheet.

Exemplarily, the fabricating an anti-reflection structure can include:

Forming the retardation film on the base substrate with the organic light emitting diode and the thin film transistor formed thereon or on the counter substrate;

Forming the first alignment layer on the retardation film; and

Forming the linear polarizer sheet on the first alignment layer.

Further, the fabricating an anti-reflection structure can further include: forming a light cutoff layer on the linear polarizer sheet.

Exemplarily, before the forming the retardation film on the base substrate with the organic light emitting diode and the thin film transistor formed thereon or on the counter substrate, in the fabrication method of the display according to the embodiment of the present disclosure, the fabricating an anti-reflection structure can further include:

Forming a second alignment layer on the base substrate with the organic light emitting diode and the thin film transistor formed thereon or on the counter substrate; and Performing rubbing alignment on the second alignment layer.

Optionally, the forming the retardation film on the base substrate with the organic light emitting diode and the thin film transistor formed thereon or on the counter substrate includes:

Coating a second material layer including a polymerizable liquid crystal and a photoinitiator on the second alignment layer;

Performing alignment curing on the second material layer.

Optionally, in a procedure of fabricating an anti-reflection structure, after the forming the first alignment layer on the retardation film, it can further include: performing rubbing alignment on the first alignment layer.

According to the embodiment of the present disclosure, in a procedure of fabricating an anti-reflection structure, the forming the linear polarizer sheet on the first alignment layer can include: coating a first material layer including a dichroic dye, a polymerizable liquid crystal and a photoinitiator on the first alignment layer; and performing alignment curing on the first material layer.

Further, when the anti-reflection structure is formed on the base substrate with the organic light emitting diode and the thin film transistor formed thereon, before the fabricating an anti-reflection structure, the fabrication method of the display according to the embodiment of the present disclosure can further includes, forming a planarization layer on the base substrate with the organic light emitting diode and the thin film transistor formed thereon, and forming subsequently formed anti-reflection structure on the planarization layer.

In this embodiment, the forming the anti-reflection structure on the counter substrate refers to forming the anti-reflection structure on a side of the counter substrate opposite to the array substrate. Further, since the anti-reflection structure so formed is located outside the display panel, in order to protect it, after the forming anti-reflection structure on a side of the counter substrate opposite to the array substrate, the fabrication method of the display further comprises: forming a protective layer on the linear polarizer sheet. Alternatively, the protective layer can further be formed on the light cutoff layer.

Exemplarily, the protective layer can be made of a transparent insulating material, for example, a transparent resin material.

Hereinafter, the fabrication method of the display according to this embodiment is exemplarily described with reference to FIG. 8a to FIG. 8e; here, with a case where the anti-reflection structure is formed on the base substrate with the organic light emitting diode and the thin film transistor formed thereon as an example, FIG. 8a to FIG. 8e show cross-sectional diagrams obtained after performing respective steps of fabricating the anti-reflection structure on the base substrate with the organic light emitting diode and the thin film transistor formed thereon.

Figure 8A:
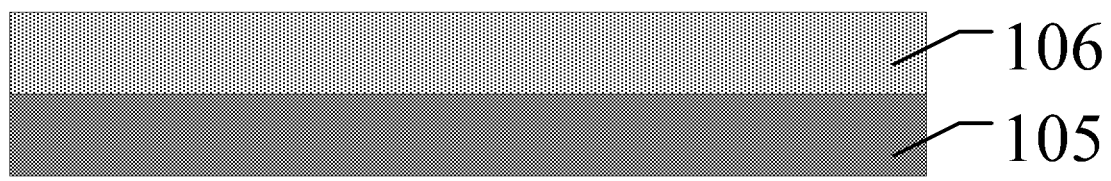
FIG. 8a to FIG. 8e are structural cross-sectional diagrams obtained after performing respective steps of fabricating an anti-reflection structure in a fabrication method according to an embodiment of the present disclosure.

As shown in FIG. 8a, the anti-reflection structure is to be formed on the base substrate 105 with a plurality of pixel units 106 including organic light emitting diodes and the thin film transistors formed thereon.

Figure 8B:
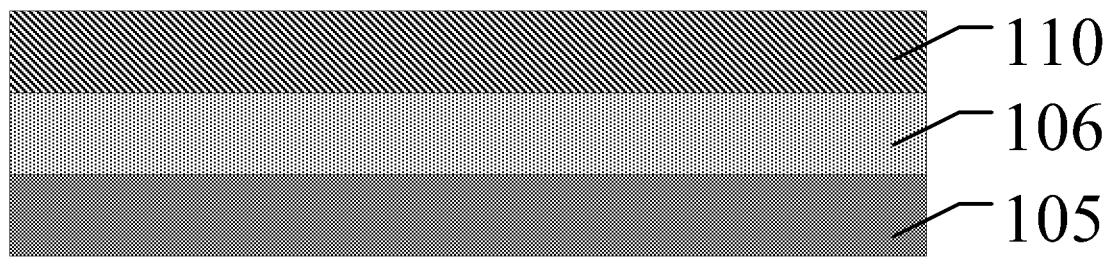
Figure 8C:
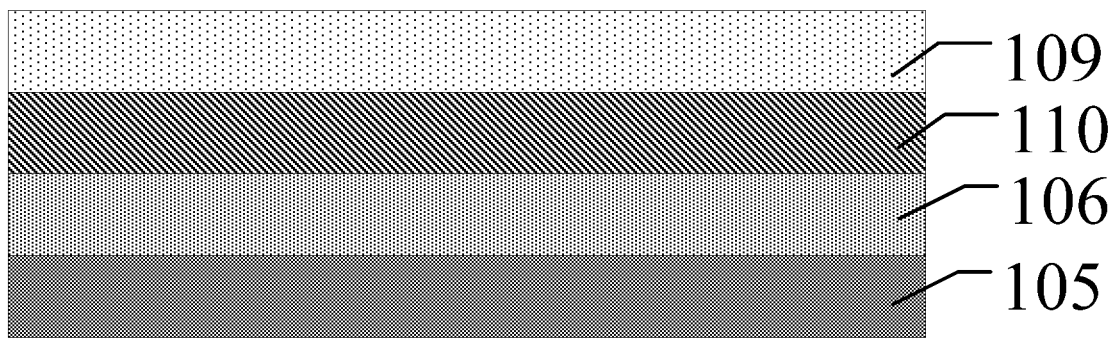

Next, the fabrication method of the display according to the embodiment of the present disclosure can include:

Forming the planarization layer 110 on the base substrate 105 with the organic light emitting diode and the thin film transistor are formed, as shown in FIG. 8b, Next, forming the second alignment layer 109 on the planarization layer 110, for example, with a polyimide material, and performing rubbing alignment on the second alignment layer 109, as shown in FIG. 8c;

Next, forming the retardation film 102 on the second alignment layer 109;

Exemplarily, the forming the retardation film 102 can include: coating the second material layer including a polymerizable liquid crystal and a photoinitiator on the second alignment layer 109, and performing alignment curing on the second material layer, for example, performing alignment curing on the second material layer with ultraviolet light (UV light).

Figure 8D:
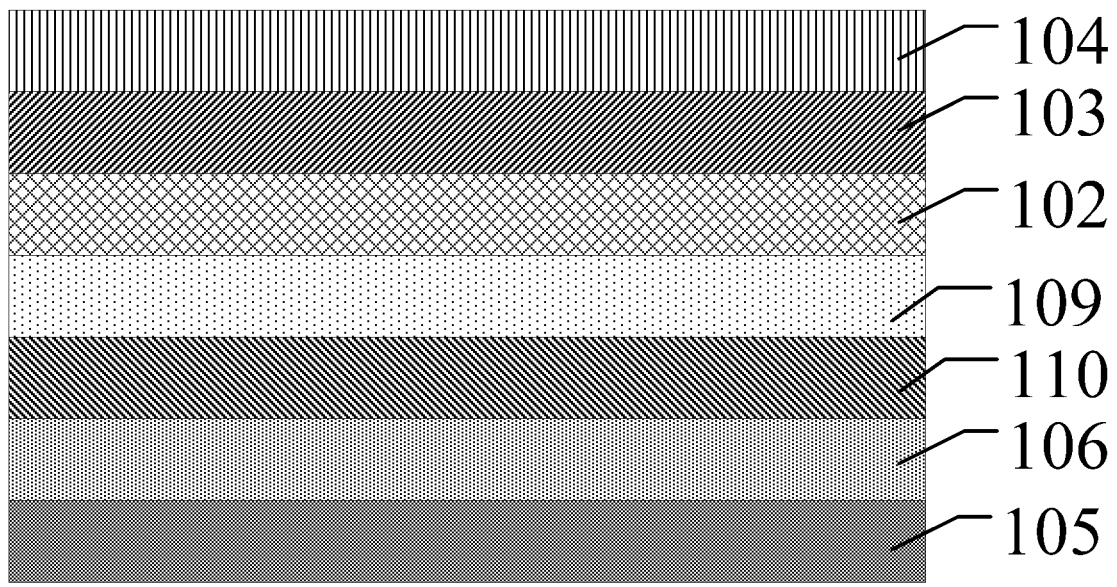

Next, forming the first alignment layer 103 on the retardation film 102, for example, with a polyimide material, and performing rubbing alignment on the first alignment layer 103;

Then, forming the linear polarizer sheet 104 on the first alignment layer 103, as shown in FIG. 8d;

Exemplarily, the forming the linear polarizer sheet 104 can include: coating the first material layer including a dichroic dye, a polymerizable liquid crystal and a photoinitiator on the first alignment layer 103; and performing alignment curing on the second material layer, for example, performing alignment curing on the second material layer with ultraviolet light (UV light).

For example, the first material layer can include a dichroic dye in a mass percentage of 1% to 20%, a polymerizable liquid crystal in a mass percentage of 75% to 95% and a photoinitiator in a mass percentage of 0.1% to 5%. Alternatively, percentage contents of the dichroic dye, the polymerizable liquid crystal and the photoinitiator are 10%, 87.5% and 2.5%, respectively.

Figure 8E:
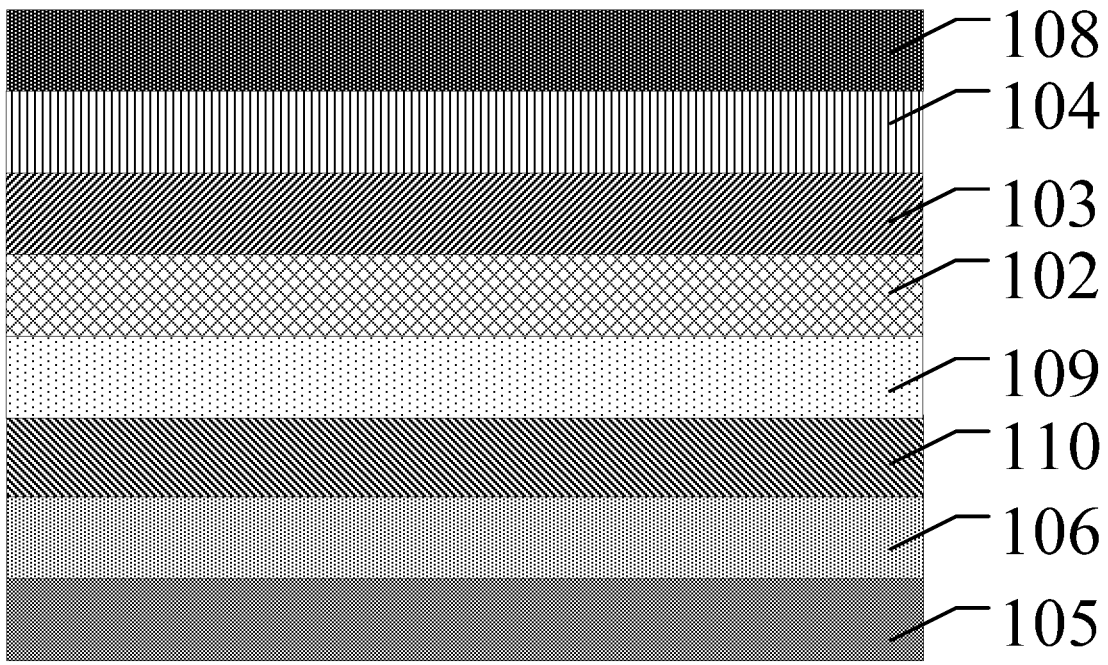

Then, forming the light cutoff layer 108 on the linear polarizer sheet 104, as shown in FIG. 8e;

Exemplarily, the forming the light cutoff layer 108 on the linear polarizer sheet 104, can include alternately depositing a plurality of high refractive index layers and a plurality of low refractive index layers by using a plasma enhanced chemical vapor deposition (PECVD) method; the high refractive index layers are silicon nitride layers, a reaction gas for depositing the silicon nitride layer is a mixed gas of $SiH_4$, $NH_3$ and $N_2$, the low refractive index layer are silicon oxide layers, and a reaction gas for depositing the silicon oxide layer is a mixed gas of $SiH_4$, $NO_2$ and $N_2$.

Corresponding to specific examples shown in FIG. 8a to FIG. 8e, FIG. 10 shows a flow chart of forming the anti-reflection structure on the base substrate. For example, when the anti-reflection structure is formed on the base substrate, it can include steps of:

Step S71: forming the planarization layer on the base substrate with the organic light emitting diode and the thin film transistor are formed.

Step S72: forming the second alignment layer on the base substrate with the planarization layer formed thereon, and performing rubbing alignment on the second alignment layer.

Step S73: coating the second material layer including a polymerizable liquid crystal and a photoinitiator on the second alignment layer, and performing alignment curing on the second material layer, to obtain the retardation film.

Step S74: forming the first alignment layer on the retardation film, and performing rubbing alignment on the first alignment layer.

Step S75: coating the first material layer including a dichroic dye, a polymerizable liquid crystal and a photoinitiator on the first alignment layer; and performing alignment curing on the first material layer, to form the linear polarizer sheet.

Step S76: forming the light cutoff layer on the linear polarizer sheet.

It should be noted that, for the above-described example, after the anti-reflection structure is formed on the base substrate, the base substrate with the organic light emitting diode, the thin film transistor and the anti-reflection structure formed thereon is assembled with the counter substrate with other necessary components formed thereon, so as to obtain the display panel in which the anti-reflection structure is located between the array substrate and the counter substrate.

Exemplarily, the anti-reflection structure is formed on the counter substrate, that is, on the side of the counter substrate opposite to the array substrate, and specific examples are given below.

Figure 11:
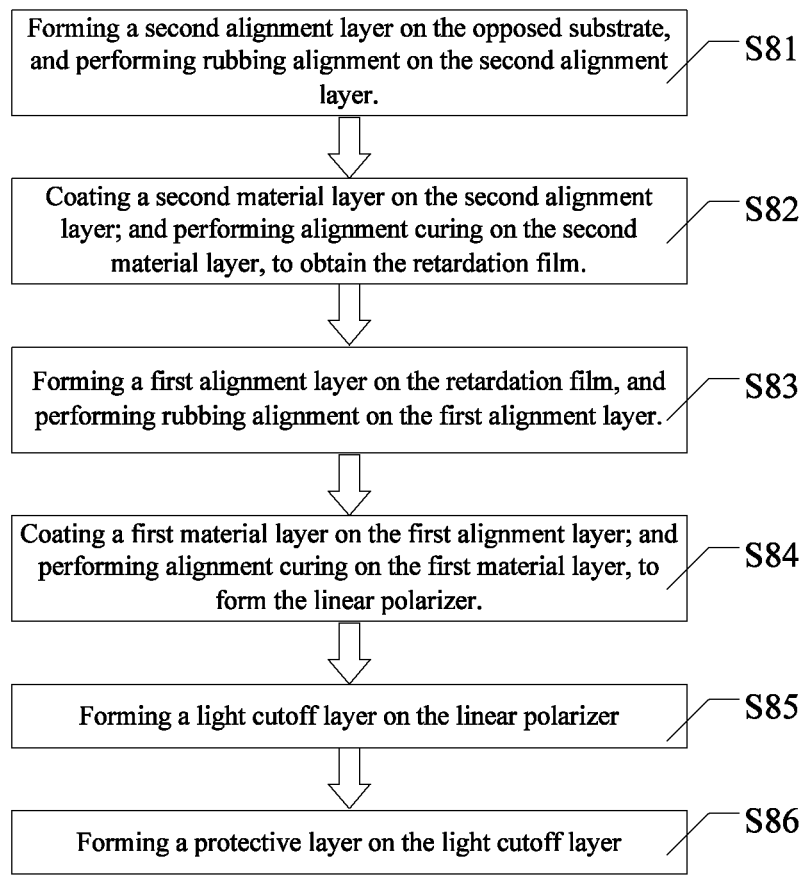
FIG. 11 is a flow chart of forming an anti-reflection structure on a counter substrate in a fabrication method according to an embodiment of the present disclosure, wherein, the anti-reflection structure is provided on a side of the counter substrate opposite to an array substrate.

As shown in FIG. 11, it is a flow chart of forming the anti-reflection structure on the side of the counter substrate opposite to the array substrate, which can include steps of:

Step S81: forming a second alignment layer on the counter substrate, and performing rubbing alignment on the second alignment layer.

Step S82: coating a second material layer including a polymerizable liquid crystal and a photoinitiator on the second alignment layer; and performing alignment curing on the second material layer, to obtain the retardation film.

Step S83: forming the first alignment layer on the retardation film, and performing rubbing alignment on the first alignment layer.

Step S84: coating the first material layer including a dichroic dye, a polymerizable liquid crystal and a photoinitiator on the first alignment layer; and performing alignment curing on the first material layer, to form the linear polarizer sheet.

Step S85: forming a light cutoff layer on the linear polarizer sheet, and for the formation process of the light cutoff layer, the above example can be referred to, which will not be repeated here.

Step S86: forming the protective layer on the light cutoff layer.

Exemplarily, for thickness ranges of the first alignment layer 103, the retardation film 102, the second alignment layer 109, the light cutoff layer 108, and the linear polarizer sheet 104, as well as a specific formation method of the light cutoff layer 108, Embodiment Two can be referred to, which will not be repeated here.

Embodiment Five

This embodiment also provides a fabrication method of a display device, which is different from the fabrication method of Embodiment Three in that: an anti-reflection structure is formed on a side of a counter substrate facing to an array substrate, and thus, after completion of fabricating the anti-reflection structure, the counter substrate needs to be reversed and assembled with the base substrate with the organic light emitting diode and the thin film transistor formed thereon to obtain a display device, wherein the anti-reflection structure is located between the array substrate and the counter substrate, no additional protective layer is needed to protect the anti-reflection structure; moreover, as compared with a case where the anti-reflection structure is directly formed on the base substrate, no planarization layer is needed; beside the above-described differences, description in Embodiment Three can be referred to for steps in the fabrication method of this embodiment, unless otherwise specified, which, for conciseness, will not be repeated here.

Exemplarily, in this embodiment, the fabricating an anti-reflection structure can include:

Forming a linear polarizer sheet on the counter substrate;

Forming a first alignment layer on the linear polarizer sheet;

Forming a retardation film on the first alignment layer.

Exemplarily, before the forming a linear polarizer sheet on the counter substrate, the fabrication method of the display according to this embodiment can further include: forming a second alignment layer on the counter substrate; and performing rubbing alignment on the second alignment layer.

Accordingly, the forming a linear polarizer sheet on the counter substrate can include: coating a second material layer including a dichroic dye, a polymerizable liquid crystal and a photoinitiator on the second alignment layer; and performing alignment curing on the second material layer.

Accordingly, after the forming a first alignment layer on the linear polarizer sheet, the fabrication method of the display according to this embodiment can further include: performing rubbing alignment on the first alignment layer.

Accordingly, the forming a retardation film on the first alignment layer, can include: coating a first material layer including a polymerizable liquid crystal and a photoinitiator on the first alignment layer; and performing alignment curing on the first material layer.

Further, before the forming a linear polarizer sheet on the counter substrate, the step of fabricating an anti-reflection structure can further include: forming a light cutoff layer on the counter substrate.

Exemplarily, the light cutoff layer is located between the second alignment layer and the counter substrate or between the linear polarizer sheet and the counter substrate.

Hereinafter, the fabrication method of the display according to this embodiment is exemplarily described with reference to FIG. 9a to FIG. 9d; here, with a case where the anti-reflection structure is formed on the counter substrate as an example, FIG. 9a to FIG. 9d show cross-sectional diagrams obtained after performing respective steps of fabricating the anti-reflection structure on the counter substrate, wherein the anti-reflection structure is provided between the counter substrate and the array substrate.

Figure 9A:
FIG. 9a to FIG. 9d are structural cross-sectional diagrams obtained after performing respective steps of fabricating an anti-reflection structure on a counter substrate in a fabrication method according to an embodiment of the present disclosure.
Figure 9B:
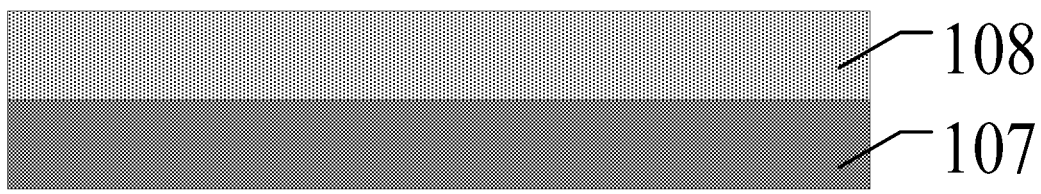

Providing a counter substrate 107, as shown in FIG. 9a;

Forming a light cutoff layer 108 on the counter substrate 107, as shown in FIG. 9b.

Exemplarily, the light cutoff layer 108 is formed by alternately depositing a plurality of high refractive index layers and a plurality of low refractive index layers by using a plasma enhanced chemical vapor deposition method. For example, the high refractive index layer is a silicon nitride layer, and a reaction gas for depositing the silicon nitride layer is a mixed gas of $SiH_4$, $NH_3$ and $N_2$, for example, in the mixed gas, a flow rate of $SiH_4$, $NH_3$ and $N_2$ can be 16:4:1; the low refractive index layer is a silicon oxide layer, a reaction gas for depositing the silicon oxide layer can be a mixed gas of $SiH_4$, $NO_2$ and $N_2$, for example, in the mixed gas, a flow rate of $SiH_4$, $NH_3$ and $N_2$ can be 40:4:1.

Figure 9C:
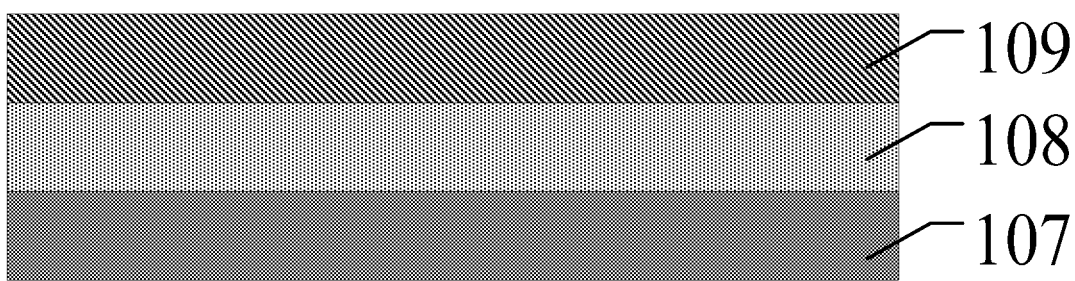
Figure 9D:
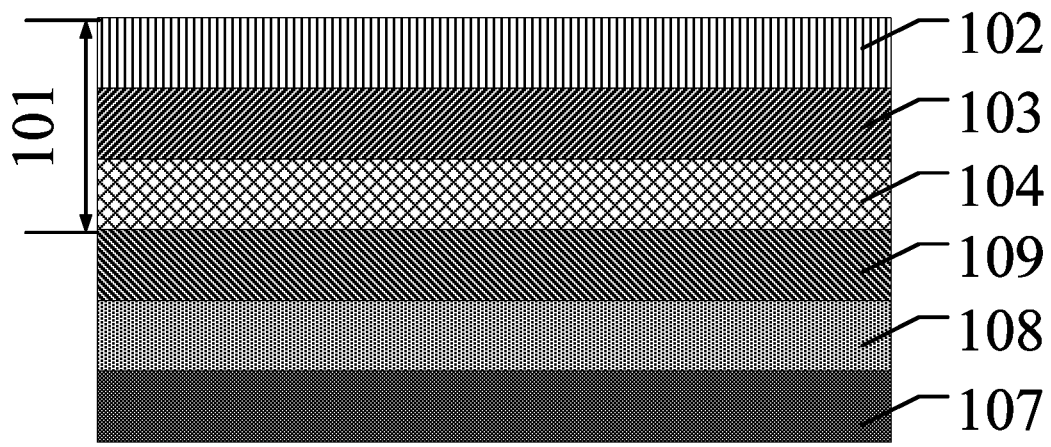
Figure 10:
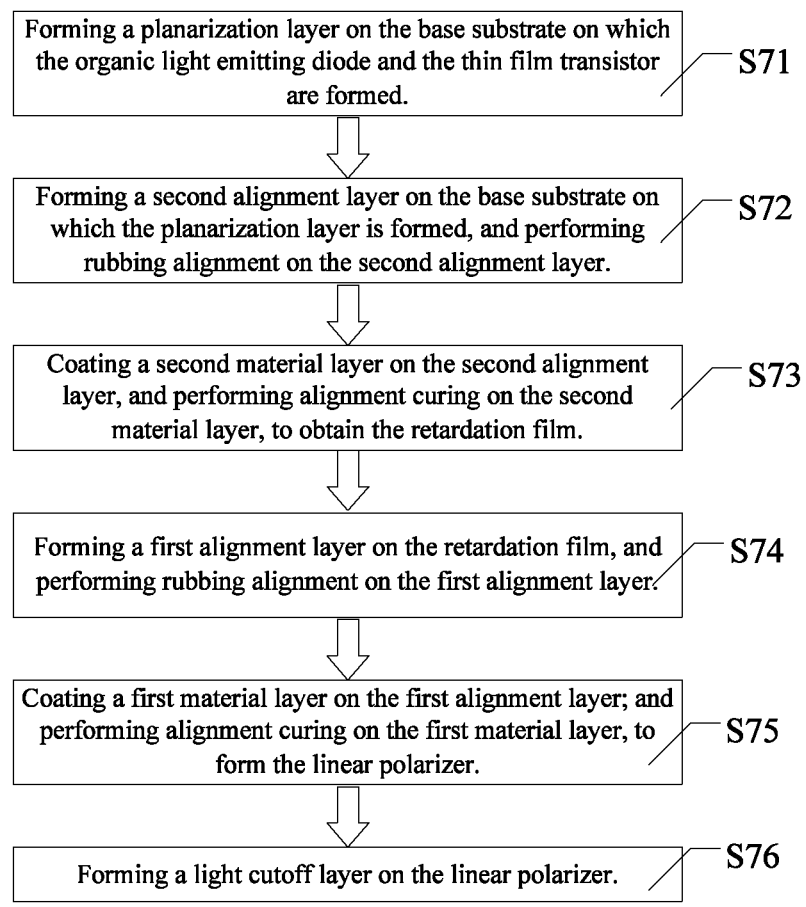
FIG. 10 is a flow chart of forming an anti-reflection structure on a base substrate in a fabrication method according to an embodiment of the present disclosure.

Forming the second alignment layer 109 on the light cutoff layer 108, and performing rubbing alignment on the second alignment layer 109, as shown in FIG. 9c;

Sequentially forming the linear polarizer sheet 104, the first alignment layer 103 and the retardation film 102 on the counter substrate 107 with the light cutoff layer 108 and the second alignment layer 109 formed thereon, as shown in FIG. 9d.

It should be noted that, for an exemplary step of forming the linear polarizer sheet 104, an exemplary step of forming the first alignment layer 103 and an exemplary step of forming the retardation film 102, corresponding description of Embodiment Two can be referred to, which, for conciseness, will not be repeated here.

Figure 12:
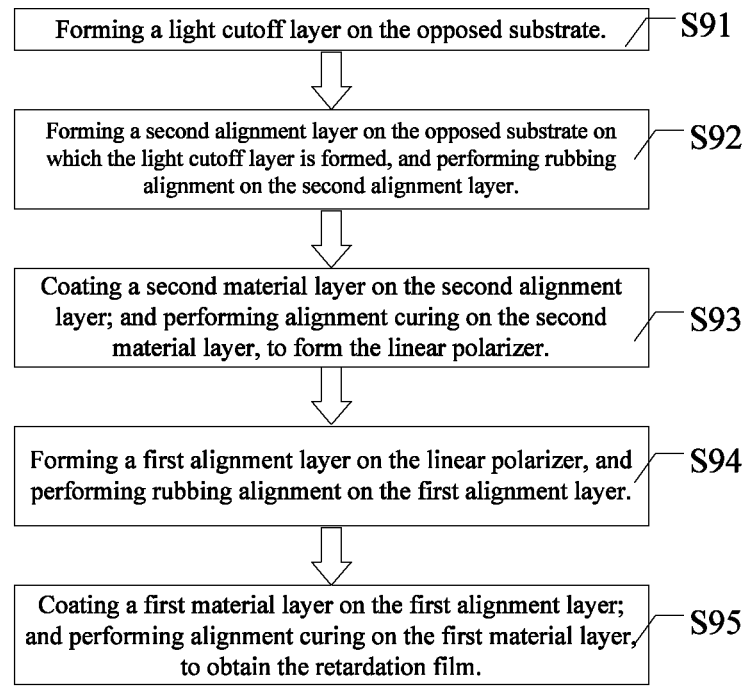
FIG. 12 is a flow chart of forming an anti-reflection structure on a counter substrate in a fabrication method according to an embodiment of the present disclosure, wherein, the anti-reflection structure is provided between the counter substrate and an array substrate.

Corresponding to FIG. 9a to FIG. 9d, FIG. 12 shows a flow chart for forming the anti-reflection structure on the counter substrate. As shown in FIG. 12, the fabricating an anti-reflection structure can include steps of:

Step S91: forming a light cutoff layer on the counter substrate.

Step S92: forming a second alignment layer on the counter substrate with the light cutoff layer formed thereon, and performing rubbing alignment on the second alignment layer.

Step S93: coating a second material layer including a dichroic dye, a polymerizable liquid crystal and a photoinitiator on the second alignment layer; and performing alignment curing on the second material layer, to form the linear polarizer sheet.

Step S94: forming a first alignment layer on the linear polarizer sheet, and performing rubbing alignment on the first alignment layer.

Step S95: coating a first material layer including a polymerizable liquid crystal and a photoinitiator on the first alignment layer; and performing alignment curing on the first material layer, to obtain the retardation film.

It should be noted that, before the forming an anti-reflection structure, some components of an OELD display panel can be formed on the counter substrate, for example, if the OLED display panel is in a mode of white OLED and color filter array (WOLED-COA), then a color filter of three colors, i.e., red, green and blue, can be formed on the counter substrate, alternatively, the color filter can be formed firstly, and then the anti-reflection structure is formed, or the anti-reflection structure can be formed firstly, and then the color filter is formed, and so on, which will not be limited in the embodiment of the present disclosure.

Here, it should be noted that, the above description is provided with a case where the display panel is an organic electroluminescent panel as an example; however, the display panel according to the embodiment of the present disclosure can further be a liquid crystal display panel including a backlight, which will not be limited in the embodiment of the present disclosure.

With respect to the anti-reflection structure, the display device and the fabrication method thereof according to the embodiment of the present disclosure, in the anti-reflection structure configured for reducing reflection of external light according to the embodiment of the present disclosure, the anti-reflection structure includes the retardation film and the linear polarizer sheet made of liquid crystal material, so that the retardation film, the linear polarizer sheet and the alignment layer can be formed by coating or other methods, and thus, as compared with the conventional anti-reflection structure provided outside the display panel, for example, by attachment, the anti-reflection structure according to the embodiment of the present disclosure has a significantly reduced thickness, so that display device adopting the anti-reflection structure can implement ultra-thin display. Further, in the embodiment of the present disclosure, in order to obtain a higher degree of polarization while thinning the anti-reflection structure, the light cutoff layer is further provided, and the light cutoff layer is configured to cut off light which is not conducive to improve the degree of polarization, so as to obtain a higher degree of polarization while reducing the thickness. In this way, the display device adopting the anti-reflection structure, effectively reduces reflection of external light by internal components, which thereby, significantly improves contrast of image display, and improves the degree of polarization while significantly reducing the thickness.

The above are only specific embodiments of the present application, but the scope of the embodiments of the present disclosure is not limited thereto, and any skilled in the art, within the technical scope disclosed by the embodiment of the present disclosure, can easily think of variations or replacements, which should be covered within the protection scope of the embodiment of the present disclosure.

The present application claims priority of Chinese Patent Application No. 201610061301.4 filed on Jan. 28, 2016, the disclosure of which is incorporated herein by reference in its entirety as part of the present application.

The invention claimed is:

1. An anti-reflection structure, comprising:
   a retardation film;
   a linear polarizer sheet, provided on a side of the retardation film;
   a light cutoff layer, provided on a side of the linear polarizer sheet away from the retardation film and configured to cut off light with a wavelength in a specific range, and
   at least one alignment layer, configured to align the retardation film and align the linear polarizer sheet, wherein the retardation film and the linear polarizer sheet include liquid crystal.

2. The anti-reflection structure according to claim 1, wherein the at least one alignment layer includes a first alignment layer, and the first alignment layer is located between the retardation film and the linear polarizer sheet, and is configured to align the retardation film and align the linear polarizer sheet.

3. The anti-reflection structure according to claim 1, wherein the linear polarizer sheet includes a dichroic dye, a polymerizable liquid crystal, and a photoinitiator, and wherein the retardation film includes a polymerizable liquid crystal and a photoinitiator.

4. The anti-reflection structure according to claim 3, wherein, in the linear polarizer sheet, the dichroic dye is in a mass percentage of 1% to 20%, the polymerizable liquid crystal is in a mass percentage of 75% to 95%, and the photoinitiator is in a mass percentage of 0.1% to 5%.

5. The anti-reflection structure according to claim 1, wherein the light cutoff layer is configured to cut off light with a wavelength in a range of 650 nm to 780 nm.

6. The anti-reflection structure according to claim 5, wherein the light cutoff layer is configured to cut off light with a wavelength in a range of 700 nm to 780 nm.

7. The anti-reflection structure according to claim 1, wherein the at least one alignment layer includes a first alignment layer and a second alignment layer,
   the first alignment layer is located between the retardation film and the linear polarizer sheet and configured to align the linear polarizer sheet,
   the second alignment layer is located on a side of the retardation film away from the linear polarizer sheet and configured to align the retardation film.

8. The anti-reflection structure according to claim 1, wherein the at least one alignment layer includes a first alignment layer and a second alignment layer, the first alignment layer is located between the retardation film and the linear polarizer sheet and configured to align the retardation film, the second alignment layer is located on a side of the linear polarizer sheet away from the retardation film and configured to align the linear polarizer sheet.

9. The anti-reflection structure according to claim 1, wherein the at least one alignment layer includes a first alignment layer and a second alignment layer, the first alignment layer is located between the retardation film and the linear polarizer sheet and configured to align the retardation film, the second alignment layer is provided between the linear polarizer sheet and the light cutoff layer and configured to align the linear polarizer sheet.

10. The anti-reflection structure according to claim 1, wherein the light cutoff layer includes a plurality of high refractive index layers and a plurality of low refractive index layers arranged alternately.

11. The anti-reflection structure according to claim 10, wherein each of the plurality of high refractive index layers is a silicon nitride layer, and each of the plurality of low refractive index layers is a silicon oxide layer.

12. The anti-reflection structure according to claim 11, wherein the plurality of the high refractive index layers are equal or unequal in thickness, and the plurality of the low refractive index layers are equal or unequal in thickness.

13. The anti-reflection structure according to claim 1, wherein the at least one alignment layer includes a first alignment layer and a second alignment layer, the first alignment layer is provided on a side of the retardation film opposite to the linear polarizer sheet and configured to align the retardation film; and the second alignment layer is provided on a side of the linear polarizer sheet opposite to the retardation film and configured to align the linear polarizer sheet.

14. The anti-reflection structure according to claim 13, wherein the light cutoff layer is provided on a side of the second alignment layer opposite to the linear polarizer sheet and configured to cut off light with a wavelength in a specific range.

15. The anti-reflection structure according to claim 14, wherein the light cutoff layer is configured to cut off light with a wavelength in a range of 650 nm to 780 nm.

16. A display device, comprising:
a display panel; and
the anti-reflection structure, according to claim 1, wherein, the display panel includes an array substrate and a counter substrate provided opposite to the array substrate, the anti-reflection structure is provided between the array substrate and the counter substrate; or the anti-reflection structure is located on a side of the counter substrate opposite to the array substrate.

17. The display device according to claim 16, wherein the array substrate includes:

a base substrate; and a plurality of pixel units, formed on the base substrate, and each of the plurality of pixel units having an organic light emitting diode and a thin film transistor formed therein.

18. The display device according to claim 17, wherein the anti-reflection structure is provided between the array substrate and the counter substrate, and a planarization layer is formed between the anti-reflection structure and the base substrate with the organic light emitting diode and the thin film transistor formed thereon.

19. A fabrication method of a display device, comprising:

providing a display panel, the display panel including an array substrate and a counter substrate provided opposite to each other, the array substrate including: a base substrate; and a plurality of pixel units formed on the base substrate, each of the plurality of pixel units having an organic light emitting diode and a thin film transistor formed therein, wherein the plurality of pixel units are located between the counter substrate and the base substrate; and fabricating an anti-reflection structure, including:

forming a retardation film, a first alignment layer, a linear polarizer sheet, and a light cutoff layer on the base substrate with the organic light emitting diode and the thin film transistor formed thereon or on the counter substrate, wherein the first alignment layer is located between the retardation film and the linear polarizer sheet, and the retardation film and the linear polarizer sheet include liquid crystal, the light cutoff layer is provided on a side of the linear polarizer sheet away from the retardation film and configured to cut off light with a wavelength in a specific range.

* * * * *